United States Patent [19]

Lewis et al.

[11] Patent Number: 4,744,604

[45] Date of Patent: May 17, 1988

[54] VIBRATION DAMPING DEVICE AND A METHOD FOR A ROAD PLANER AND THE LIKE

[75] Inventors: Roger L. Lewis, Leawood; Richard S. Norland, Stillwell, both of Kans.; Leon D. Jones, Elba, N.Y.

[73] Assignee: Federal-Mogul Corporation, Southfield, Mich.

[21] Appl. No.: 948,450

[22] Filed: Dec. 30, 1986

Related U.S. Application Data

[63] Continuation of Ser. No. 720,586, Apr. 8, 1985, abandoned.

[51] Int. Cl.⁴ .................. E21C 41/00; E01C 23/09
[52] U.S. Cl. ..................................... 299/10; 299/39; 404/90; 248/636; 188/268; 188/378
[58] Field of Search ................. 299/10, 39; 404/90, 404/91; 188/268, 378; 173/162.1, 139, 162.2; 248/562, 636; 366/62; 293/104; 296/205; 83/343

[56] References Cited

U.S. PATENT DOCUMENTS

| | | | |
|---|---|---|---|
| 1,294,467 | 2/1919 | Hovas . | |
| 1,461,787 | 3/1920 | Stebbins . | |
| 2,195,041 | 3/1940 | Schlippe | 188/103 |
| 2,267,171 | 12/1941 | Rubissow | 74/513 |
| 2,277,111 | 3/1942 | Johnson | 200/166 |
| 2,375,818 | 5/1945 | Peters | 188/268 |
| 2,417,347 | 3/1947 | Brown | 188/1 |
| 2,746,768 | 5/1956 | Bowser | 280/150 |
| 2,869,700 | 1/1959 | Bowden | 188/268 |
| 3,348,795 | 10/1967 | Schilling | 248/562 |
| 3,469,809 | 9/1969 | Reznick et al. | 188/268 X |
| 3,695,562 | 10/1972 | Daniel . | |
| 4,086,984 | 5/1978 | Johansson | 299/94 X |
| 4,255,482 | 3/1981 | Udagawa . | |
| 4,310,198 | 1/1982 | Destree . | |
| 4,333,685 | 6/1982 | Arnswald | 299/39 |
| 4,333,686 | 6/1982 | Arnswald | 299/39 |
| 4,360,088 | 11/1982 | Amble | 188/380 |
| 4,438,460 | 3/1984 | Buechler | 358/299 |
| 4,440,434 | 4/1984 | Celli | 296/205 X |
| 4,548,112 | 10/1985 | Thomas | 83/343 X |

FOREIGN PATENT DOCUMENTS

| | | |
|---|---|---|
| 0028141 | 6/1981 | European Pat. Off. . |
| WO85/05425 | 12/1985 | PCT Int'l Appl. . |
| 26655 | 6/1914 | United Kingdom ......... 296/205 |
| 108067 | 7/1917 | United Kingdom . |
| 1293391 | 10/1972 | United Kingdom . |

Primary Examiner—James A. Leppink
Assistant Examiner—Matthew Smith
Attorney, Agent, or Firm—Lawrence J. Shurupoff; Robert F. Hess

[57] ABSTRACT

A vibration damper for a road planer and the like with a main frame and a sub-frame movably connected thereto. A prime mover and a tool are mounted on the sub-frame, which includes frame members forming compartments adapted to receive lead shot particles therein. The particles absorb vibrational energy from the prime mover and the tool. A method of damping vibration is disclosed wherein vibrational energy is transmitted to the lead shot particles which vibrate and generate heat. The heat is dissipated through the frame members to the atmosphere.

20 Claims, 5 Drawing Sheets

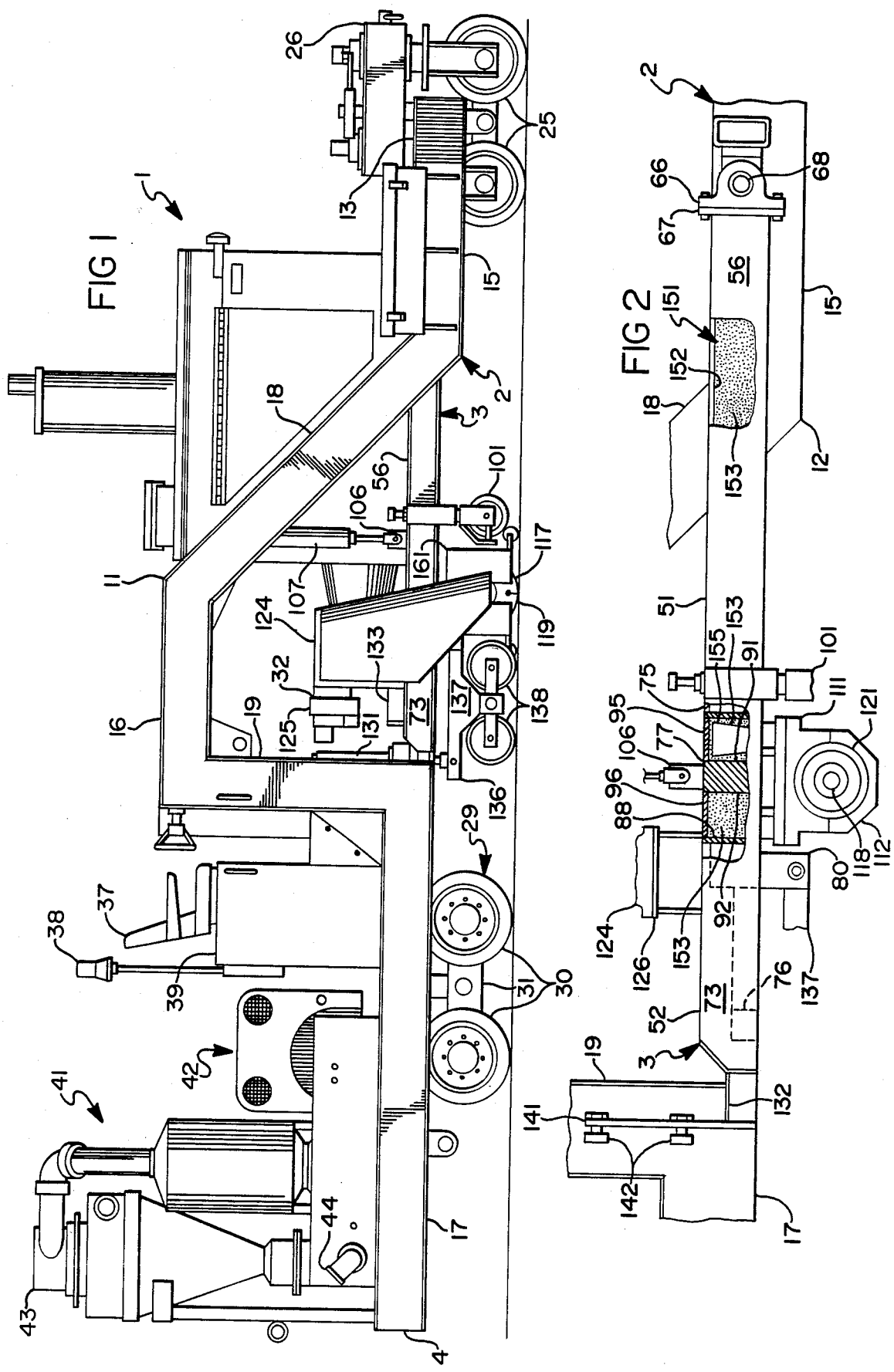

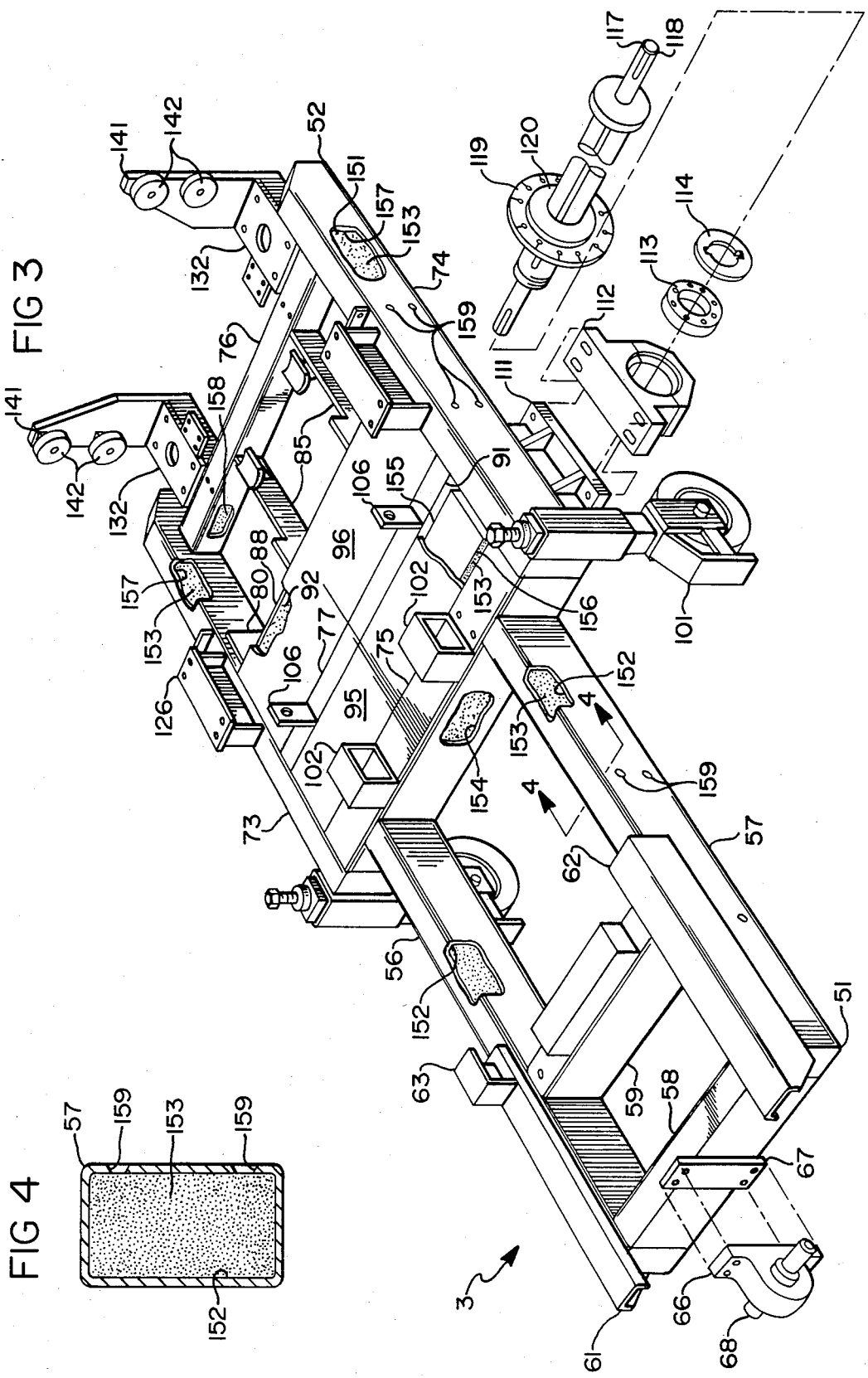

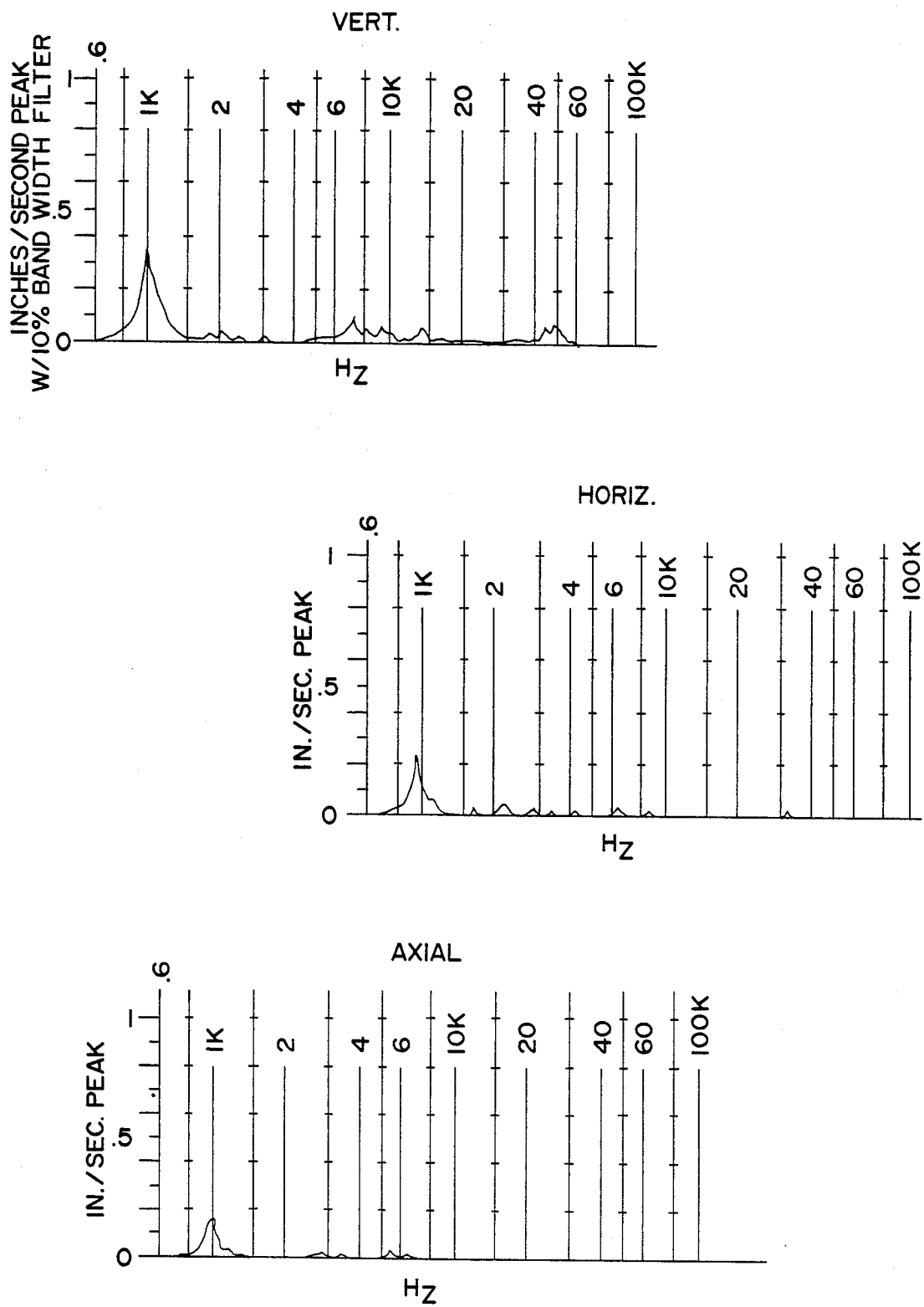

FIG 7
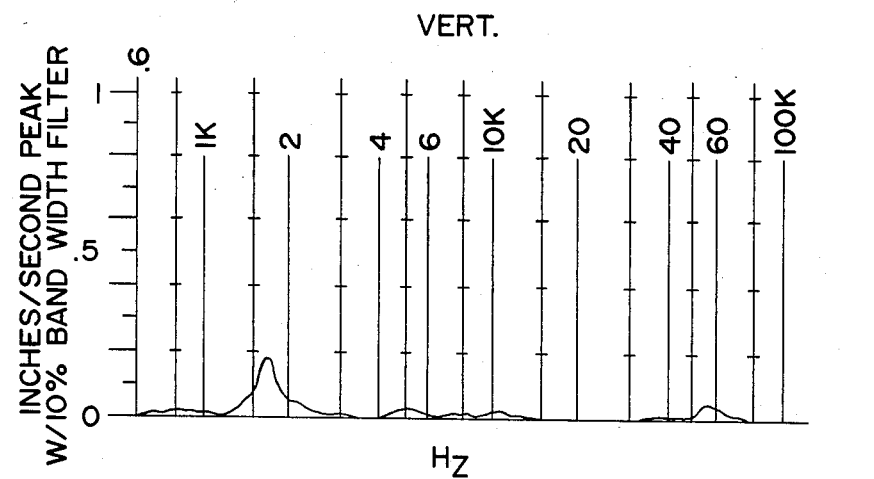
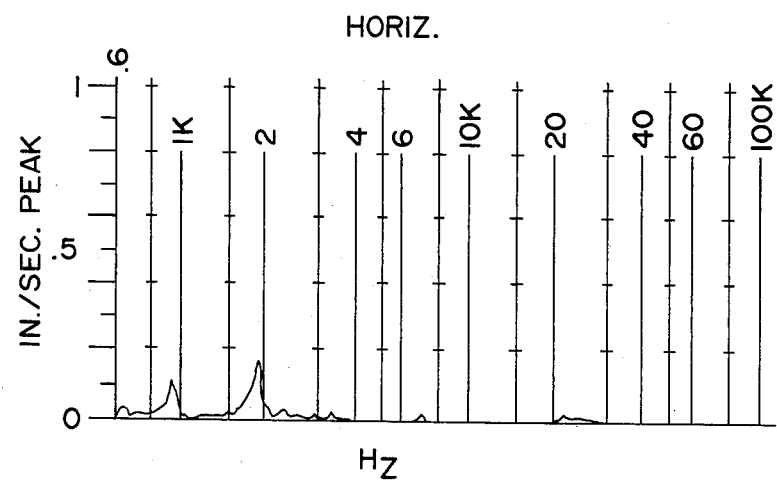
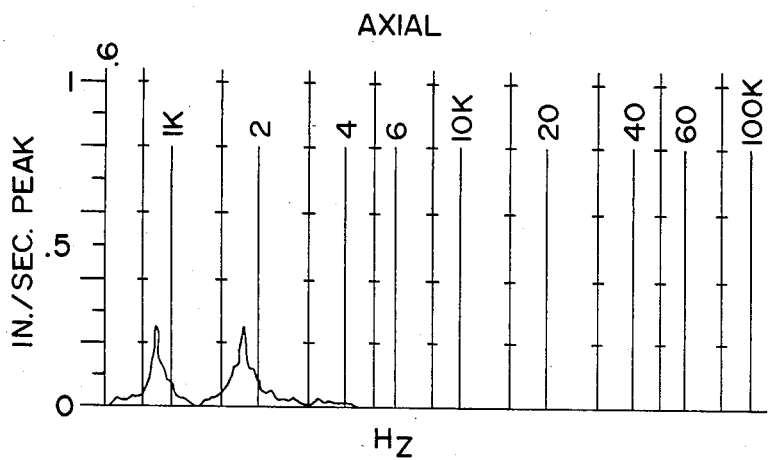

VIBRATION DAMPING DEVICE AND A METHOD FOR A ROAD PLANER AND THE LIKE

This application is a continuation, of application Ser. No. 720,586, filed Apr. 8, 1985, now abandoned.

BACKGROUND OF THE INVENTION

1. Field of the Invention

This invention relates generally to vibration damping and, in particular, to a vibration damper for pavement working equipment.

2. Description of the Prior Art

Various types of equipment generate vibration which must be isolated or damped for optimum performance. For example, pavement working equipment such as planers, grinders, saws and the like generate and are subjected to relatively severe vibrational forces which, if left undamped, would seriously impair their performance. A typical piece of pavement working equipment includes a tool such as a saw, grinder or the like operably connected to a prime mover adapted for powering the tool and possibly for driving the piece of equipment.

For example, a ROAD SURFACING APPARATUS is shown in the commonly-assigned Arnswald U.S. Pat. Nos. 4,333,685 and 4,333,686. The Arnswald road planers include cutter heads with circular, diamond-tipped saw blades mounted on a sub-frame which, in turn, is pivotally connected to a main frame. A prime mover comprising an internal combustion engine is also mounted on the sub-frame and provides balast for urging the cutter head into contact with a pavement surface. The engine drives the cutter head and the hydraulically-driven wheels of the planer.

The sub-frame of the Arnswald planer is subjected to vibration from both the engine and the cutter head, both of which are mounted thereon. The internal combustion engine produces primarily vibration in a vertical mode due to the reciprocation of its pistons. The cutter head, on the other hand, produces vibration with respect to the vertical, horizontal (along the direction of travel) and axial (transverse to the direction of travel) spatial axes. The vibration of the cutter head substantially reduces its effectiveness and greatly increases wear on the cutter blades.

The use of small metal particles for shock and vibration absorption has heretofore been proposed. For example, the Hovas U.S. Pat. No. 1,294,467 discloses a shock absorber with a cylindrical container filled with small metal balls which interact with disks mounted on a plunger rod reciprocated within the container. The Brown U.S. Pat. No. 2,417,347 discloses a vibration damper including compartments filled with metal particles ranging in size from shot to fine powder, depending upon the frequency of vibration to be absorbed.

However, heretofore there has not been available either a vibration damping device or method for a road planer and the like with the advantages and features of the present invention.

SUMMARY OF THE INVENTION

In the practice of the present invention, a vibration damper is provided for a road planer and the like. The road planer includes a main frame and a sub-frame pivotally connected thereto. A prime mover and a tool are mounted on the sub-frame and subject the latter to relatively severe vibration, which impairs the operation of the tool. The sub-frame includes a plurality of tubes each enclosing a bore. The bores are substantially filled with lead shot particles which are free to move and vibrate with respect to each other and the tubes and thus absorb vibrational energy from the prime mover and the tool.

A method of damping vibration is also disclosed which includes the steps of providing a frame member with an enclosure, placing lead shot particles in the enclosure, vibrating the frame with a prime mover and a tool, causing the particles to vibrate with respect to each other and with respect to the frame member, converting the vibrational energy of the particles at least partly to heat energy and dissipating the heat energy through the frame member.

OBJECTS OF THE INVENTION

The principal objects of the present invention are: to provide a vibration damper; to provide such a damper which is particularly well adapted for use with a road planer; to provide such a damper which utilizes hollow frame members filled with particles for vibration damping; to provide such a damper which is adapted for use with a frame having a prime mover and a tool mounted thereon; to provide such a damper which utilizes random-sized lead shot as a slightly constrained mass for absorbing vibration; to provide such a damper wherein at least some of the shot particles are elliptical in configuration; to provide such a damper wherein at least some of the shot particles are spherical in configuration; to provide such a damper which increases blade life on pavement working equipment; to provide such a damper which allows pavement working equipment to operate at greater speeds than similar equipment undamped; to provide such a damper which is adapted for use on a variety of equipment; to provide such a damper which is adapted for use with equipment for working existing and new pavement; to provide such a damper wherein the particles also function as ballast to provide such a damper which is effective for controlling vibration in vertical, horizontal and axial spatial axes; to provide such a damper which is economical in operation, efficient to manufacture, capable of a long operating life and particularly well adapted for the proposed usage thereof; to provide a method of damping vibration; to provide such a method wherein undesirable vibration is absorbed by particles; to provide such a method wherein vibrational energy in the particles is converted to thermal energy; to provide such a method wherein the thermal energy is dissipated; and to provide such a method which is particularly well adapted for use in conjunction with pavement working equipment and the like.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a side elevation of a road planer with a vibration damper embodying the present invention.

FIG. 2 is a fragmentary, longitudinal cross-section of the road planer particularly showing a sub-frame thereof.

FIG. 3 is a perspective of the sub-frame with portions broken away to reveal the vibration damper construction.

FIG. 4 is an enlarged, fragmentary, vertical cross-section of the sub-frame taken generally along line 4—4 in FIG. 3.

FIG. 5 is a graph showing vibrational performance of a road planer with ingots for ballast.

FIG. 7 is a graph showing vibrational performance of a road planer with random-sized lead shot for vibration damping particles.

DETAILED DESCRIPTION OF THE PREFERRED EMBODIMENTS

Figure 6:
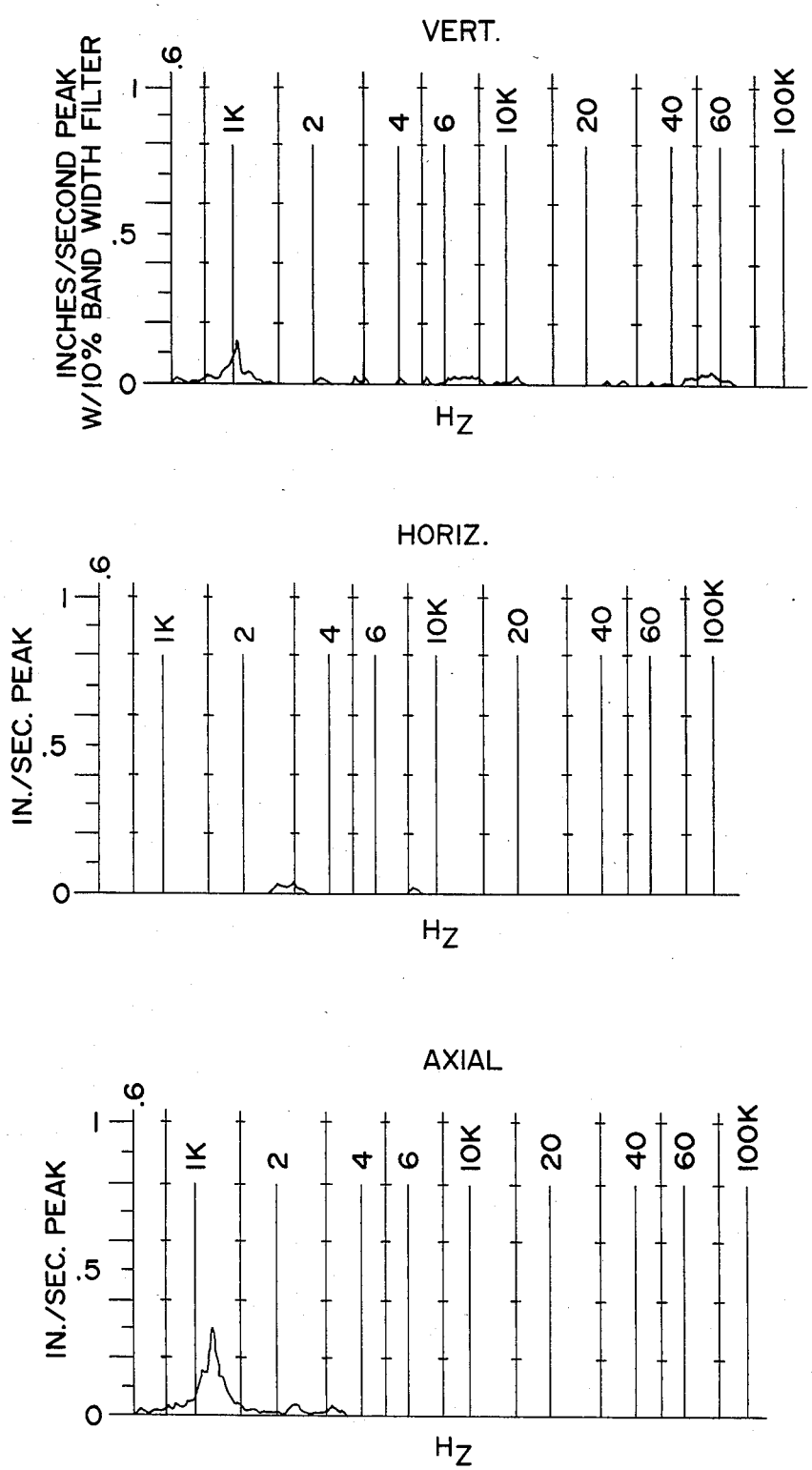
FIG. 6 is a graph showing vibrational performance of a road planer with spherical shot for vibration damping particles.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates a road planer embodying the present invention. The road planer 1 is of the type disclosed in U.S. Pat. No. 4,333,685 for ROAD SURFACING APPARATUS and U.S. Pat. No. 4,333,686 for ROAD PLANER DEVICE WITH AUXILIARY OUTRIGGER DEPTH CONTROL WHEELS, both of which are commonly assigned herewith and are incorporated herein by reference.

I. ROAD PLANER DESCRIPTION

The road planer 1 generally includes a rigid main frame 2 and a rigid sub-frame 3 pivotally connected to the main frame 2. The main frame 2 primarily comprises a pair of right and left side members 11, 12 extending substantially parallel to each other and joined at their respective front and back ends 13, 14. Each side member 11, 12 includes front, intermediate and back horizontal sections 15, 16, and 17. The intermediate section 16 is joined to the front and back sections 15, 16 by a rearwardly and upwardly sloping leg 18 and by a vertical leg 19 respectively. The side members 11, 12 preferably comprise hollow steel tubes with rectangular cross-sectional configurations.

A pair of front wheels 25 are mounted in tandem on the main frame front end 13 and are coupled to a steering mechanism 26. A rear wheel assembly 29 comprises two pair of wheels 30, each pair being mounted in tandem relationship on a pivotable rear wheel beam 31 which is attached to the main frame 2. The front and rear wheels 25, 30 are driven by an hydraulic drive, system 32.

The planer 1 includes a pair of operator's stations each having a respective seat 37 and dual controls to facilitate making pavement cuts on either the right-hand or left-hand side of the planer 1. The operator's seats 37 and a warning beacon 38 are mounted on a pedestal 39 behind the side member vertical legs 19. A cutter head cooling and slurry disposal system 41 includes an auxiliary engine 42 mounted behind the pedestal 39 for powering a vacuum pump (not shown) connected to a cyclo-separator 43 and a water pump (not shown). Water for cooling is supplied to the planer 1 from a suitable tank vehicle (not shown) through a coupling 44. The auxiliary engine 42 may comprise, for example, a Perkins Model No. 4.154 4-cylinder water cooled diesel engine.

The sub-frame 3 generally comprises an engine section 51 in front and a tool section 52 in back. The engine section 51 includes a pair of right and left side tubes 56, 57 extending longitudinally in parallel relationship to the direction of travel of the road planer 1. A front crosstube 58 interconnects the side tubes 56, 57 at their respective front ends. An intermediate crosstube 59 extends between and interconnects the side tubes 56, 57 behind the front crosstube 58. Right and left engine mounts 61, 62 are attached to the engine section side tubes 56, 57 respectively at their front ends. A scavenging pump mount 63 is attached to the right engine mount 61 and projects upwardly therefrom.

The sub-frame 3 is pivotally connected to the main frame 2 by a sub-frame bearing assembly 66 attached to the front crosspiece 58 by a bearing mount plate 67. A transversely extending pivot pin 68 is journalled in the bearing assembly 66 and is received in respective ears (not shown) extending rearwardly from a crosstube (also not shown) of the main frame 2.

The sub-frame tool section 52 includes right and left side tubes 73, 74 extending in parallel, spaced relation longitudinally in the direction of travel. Front and back crosstubes 75, 76 extend transversely between and interconnect the side tubes 73, 74. The tool section side tubes 73, 74 are spaced farther apart transversely than the engine section side tubes 56, 57. The engine section side tubes 56, 57 are fixedly attached at their back ends to the front crosstube 75 of the sub-frame tool section 52.

A crossbar 77 extends transversely between the engine section side tubes 73, 74 parallel to and in spaced relation rearwardly from the front crosstube 75. The crossbar 77 preferably comprises solid steel having cross-sectional dimensions of, for example, four inches thick and eight inches high.

A pair of outer depth control carrier plates 80 are connected to and extend parallel to the side tubes 73, 74. A pair of inner depth control carrier plates 85 extend between the crossbar 77 and the back crosstube 76 in parallel relation to the side tubes 73, 74 and in spaced relation inwardly from the outer depth control carrier plates 80. A rear ballast compartment panel 88 extends transversely between the depth control carrier plates 80, 85.

The sub-frame tool section 52 defines front and rear ballast compartments 91, 92. A lower panel (not shown) extends longitudinally between the front crosstube 75 and the crossbar 77 and transversely between the side tubes 73, 74. A front upper panel 95 likewise extends longitudinally between the front crosstube 75 and the crossbar 77 and transversely between the side tubes 73, 74 whereby the front ballast compartment 91 is completely enclosed.

The rear ballast compartment 92 is completely enclosed in a similar manner by a rear lower panel (not shown) and a rear upper panel 96, each of which extends, longitudinally between the crossbar 77 and the rear ballast compartment panel 88 and transversely between the outer depth control carrier plates 80.

A pair of outrigger wheel assemblies 101 are mounted on the side tubes 73, 74 at their front ends. A pair of engine mounts 102 are attached to and extend upwardly from the front crosstube 75. An internal combustion engine or prime mover 103 is mounted on the front and rear engine mounts 61, 102. The engine 103 may comprise, for example, a Caterpillar MOD 3406DT 6-cylinder diesel engine developing 402 horsepower at 2100 revolutions per minute. Of course, any suitable power source could be substituted for the diesel internal combustion engine 103 disclosed herein.

A pair of lower cylinder mounts 106 are attached to and project upwardly from the crossbar 77. A pair of double-acting hydraulic ram cylinders 107 are attached to the lower cylinder mounts 106 and to the main frame 2.

A pair of cutter head mounting brackets 111 are attached to and depend downwardly from the side tubes 73, 74 approximately where the latter are attached to the crossbar 77. A respective cutter head bearing assembly 112 is attached to each mounting bracket 111 in downwardly-depending relationship therefrom. Each bearing assembly 112 includes a bearing race 113 and a retainer 114 mounted thereover. The cutter head bearing assemblies 112 preferably comprise Dodge special duty double taper roller bearings.

A cutter head 117 includes a shaft 118 journalled in the bearing assemblies 112 and a plurality of juxtaposed, circular blades 119 mounted on the shaft 118 in coaxial relationship with the rotational axis of the cutter head 117. The blades may comprise, for example, 14" diameter, ⅛ inch thick diamond blades of the type available from the Target Products Division of Federal-Mogul Corporation, Kansas City Mo. A standard cutter head such as that shown at 117 might include, for example, 174 of the blades 119 separated by 0.120 inches thick spacers 120. Cutter head pulleys 121 are attached to each end of the cutter head shaft 118. The engine 103 is coupled to a right angle drive 124 which includes pulleys (not shown) connected to the cutter head pulleys 121 by multiple drive belts (also not shown). The engine 103 is also connected to an hydraulic pump 125 for powering the hydraulic systems of the planer 1.

The right angle drive transmission 124 is mounted adjacent to its transverse drive shafts (not shown) on the side tubes 73, 74 by transmission support assemblies 126 projecting upwardly from respective side tubes 73, 74. The transmission support assemblies 126 are each located partly laterally adjacent to and partly behind the rear balast compartment 92.

A pair of actuated jack assemblies 131, which are available under the trade name "Jactuator", are mounted on respective jack mounts 132 extending rearwardly from the back crosstube 76. A pair of jack motors 133 are provided for driving the actuated jack assemblies 131 and are mounted on the inner depth control carrier plates 85. The actuated jack assemblies 131 are connected to the back ends of a pair of depth control wheel carriages 136, each of which is pivotally mounted on respective depth control carrier plates 80, 85. Each carriage 136 includes a pair of pivot beams 137 with a pair of depth control wheels 138 mounted therebetween in tandem relationship. A pair of cam plates 141 are mounted on the back ends of respective jack mounts 132 and each receives a pair of cam rollers 142 along its outer edge for engaging a respective side member vertical leg 19.

II. VIBRATION DAMPER DESCRIPTION

A vibration damper 151 comprises an integral part of the sub-frame 3 and includes lead shot 153 and a lead ingot 155 located in spatial voids formed by the structural members of the sub-frame 3. The engine section side tubes 56, 57 include spatial voids or bores 152 adapted to receive the lead shot 153. The tool section front crosstube 75 encloses a front crosstube bore 154 adapted to receive the lead shot 153. The front ballast compartment 91 receives a lead ingot 155. The lead ingot 155 is dimensionally slightly smaller than the front ballast compartment 91 whereby a space 156 is formed therebetween and filled with lead shot 153. The rear ballast compartment 92 is filled with lead shot 153, as are tool section side tube bores 157 and a back crosstube bore 158. The tube bores 152, 154, 157, 158 are accessed through fill holes 159 in the respective members which are welded shut after filling. If necessary, the members may be vibrated during filling to settle the lead shot 153 and to provide sufficient room for the amount specified for the road planer 1. The front and rear ballast compartments 91, 92 are accessible prior to placement of the front and rear upper panels 95, 96 respectively.

The lead shot 153 is preferably random-sized and capable of passing through a No. 17/18 mesh. For example, "Illinois Heavy Pack Lead Shot", available from the Division Lead Company, Summit, Ill., has been tested and found to be suitable for the proposed usage thereof. The Illinois Cold Pack Shot comprises both elliptical and spherical particles. Furthermore, the sizes of the individual particles vary somewhat. The random-sized Illinois Cold Pack Shot not only has superior performance characteristics as will be discussed more fully hereinafter, but also is less expensive than, for example, spherical shot. The mean diameter size of the shot 153 is in the range of approximately 0.030 to 0.040 inches.

III. PLANER OPERATION

The planer 1 disclosed herein is intended primarily for removing high spots from new concrete-paved surfaces to conform them to specifications and also to restore existing concrete-paved surfaces by removing predetermined amounts of damaged or deteriorated concrete. Additional applications of the planer 1 include longitudinal cutting of anti-hydroplane grooves and conditioning of runways, parking lots and various other concrete-paved surfaces.

The cutter head 117 rotates in a counterclockwise direction when viewed from the right side of the grader 1 whereby it resists forward motion of the grader 1. The cutter head 117 is preferably subjected to substantial downward forces to maximize its performance. The downward loading of the cutter head 117 is accomplished by extending the hydraulic cylinders 107 until the hydraulic pressure in the hydraulic system is approximately 600 pounds per square inch. If the hydraulic pressure exceeds this amount and reaches, for example, 800 pounds per square inch, a safety valve is opened to prevent damage to the machine and injury to the operator. The weight of the lead shot 153, approximately 800 pounds in the disclosed planer 1, also facilitates holding the cutter head 117 in contact with the pavement surface. Also, the lead shot 153 cooperates with the members of the sub-frame 3, the engine 103 and the ingot 155 to damp vibration and also to provide ballast.

Extending the hydraulic cylinders 107 pivots the sub-frame 3 with respect to the main frame 1 about the pivot pin 68 and transfers a portion of the weight of the main frame 2 and the equipment associated therewith to the sub-frame 3. The depth control wheels 138 are located at a desired vertical position with respect to the sub-frame 3 by the actuated jack assemblies 131. The actuated jack assemblies 131 are preferably used to lower the depth control wheel carriages 136 to a level of a predesired planing depth. The actuated jack assemblies 131, since they employ screw-thread rods, will support the entire weight of the road planer 1 with the rear wheels 30 lifted off the surface. However, the actuated jack assemblies 131 are preferably adjusted by the operator so that the downward pressure on the cutter head 117 is slightly less than that required to lift the rear wheels 30.

The hydraulic cylinders 107, on the other hand, are somewhat compressible. Furthermore, the entire main frame 2 is designed to flex a limited amount. Thus, upon encountering an uneven pavement surface condition, the main frame 2 deflects a limited amount which, together with the slight compression of the hydraulic cylinders 107, functions to maintain the cutter head 117 in substantially consistent contact with the pavement surface. Furthermore, the hydraulic cylinders 107 and the actuated jack assemblies 131 permit retraction of the cutter head 117 for transporting to and from job sites and the like.

In operation, it is desirable to cool the cutter head 117 to prolong the useful lives of the blades 119. Also, it is usually necessary to contain at least a portion of the slurry comprising cooling water mixed with grindings and tailings. A shroud 161 is provided over the cutter head 117 and includes a spray bar with water nozzles and intake ducts for removing the slurry. The shroud 161 is connected to the cyclo-seperator 43 and comprises a part of the cooling and slurry disposal system 41.

As the sub-frame 3 is raised and lowered by the hydraulic cylinders 107, the sub-frame 3 is maintained in a substantially level position with respect to the main frame 2 by the cam rollers 142 engaging the side member vertical legs 19 to avoid racking or twisting of the sub-frame 3 relative to the main frame 2.

IV. VIBRATION DAMPER OPERATION

In use, the cutter head 117 is a vibration source and vibrates with respect to all three spatial axes relative thereto. For purposes of describing the present invention, these axes will be referred to as: (1) vertical; (2) horizontal (in the direction of planer travel); and (3) axial (along the rotational axis of the cutter head 117 extending transverse to the direction of travel). Of the three axial components of cutter head 117 vibration, the vertical is believed to be the most significant with respect to potential damage to the blades 119 and performance of the planer 1. Even though the blades 119 have diamond cutting edges, continual pounding, particularly from vertical vibration, causes damage and a loss of cutting ability. Cutter head vibration diverts energy from the cutting and planing function of the blades 119 so that the operator must reduce the forward speed of the planer 1 in order to maintain cut depth uniformity. The engine 103, which is mounted on the sub-frame 3, is also a vibration source and contributes to the vibration of the cutter head 117, particularly in a vertical mode because of the vertical reciprocation of the pistons of the engine 103.

By absorbing the vibrational energy of the cutter head 117, the vibrational movements in all three spatial axes can be reduced for longer blade life and a higher forward speed. A particularly effective way to absorb vibrational energy is to couple the cutter head 117 to an unconstrained or slightly constrained mass. The damper assembly 151 is designed to operate as such a slightly constrained mass. Stated generally, the cutter head vibrations are transmitted to and absorbed by the lead shot 153 which is sized and configured for maximum freedom of movement and vibration within the sub-frame 3. The individual particles of the lead shot 153 vibrate with respect to each other and also with respect to the members of the sub-frame 3. Thus, vibrational energy from both the cutter head 117 and the engine 103 is converted to thermal energy which is transferred to and dissipated by the sub-frame 3.

In sizing and configuring the lead shot 153, it is desirable to maximize both the potential and kinetic energies of the damper system 151. The potential energy U, may be expressed by the following equation wherein "K" represents the elastic coordinates of a particular shot particle and "q" represents the mass coordinates thereof. Thus, Potential Energy =

$$U = \tfrac{1}{2} [(K_{11}(q_1)^2 + K_{22}(q_2)^2 + K_{33}(q_3)^2 + \ldots) +$$
$$(K_{12}q_1q_2 + \ldots + K_{21}q_2q_1 + K_{22}q_2q_3 + \ldots) +$$
$$K_{31}q_3q_1 + K_{32}q_3q_2 \ldots +)]$$

The kinetic energy "T" is represented by the following forumula wherein "m" represents the mass inertial elements of an individual shot particle. Thus, Kinetic Energy =

$$T = \tfrac{1}{2} [(m_{11}(q_1)^2 + m_{22}(q_2)^2 + m_{33}(q_3)^2 \ldots) +$$
$$(m_2q_1q_w + m_{13}q_1q_3 + \ldots + m_{21}q_2q_1 +$$
$$M_{23}q_2q_3 + \ldots + m_{31}q_3q_1 + m_{32}q_3q_2 + \ldots)]$$

In both of the above equations, the potential and kinetic energies of the particle are expressed as sums of particle movement in all three spatial axes. Also, it can be concluded from the above formulas that the potential and kinetic energies are directly related to the mass, i.e. the density, of the lead shot. The density of the lead shot 153 is directly related to the size thereof because the smaller shot sizes tend to have smaller percentages of void area. With spherical particles, maximum packing density is obtained if the individual spheroids are packed in a hexagonal close packed configuration, or HCP, which configurization results in a minimum amount of void space for a given mass. The elliptical, random-sized lead shot 153 utilized by applicant is believed to at least partly assume an HCP configuration, although because of the random sizing and the elliptical configurations of some of the shot, voids between the larger particles are often filled by the smaller particles, whereby relatively high density is achieved.

The above formulas for potential and kinetic energy would tend to indicate that the maximum vibration damping capability might be achieved with a finely ground powder; however, as the particles become smaller, intermolecular attraction forces therebetween increase according to Van Der Waals' Equation of State whereby the particles begin to act as a single mass. In particular, clumping and bridging of groups of small particles occur whereby the groups tend to vibrate relative to each other but not amongst their particle components. The resulting restriction of movement in the three spatial axes decreases potential and kinetic energy according to the above formulas.

It has been empirically determined that the lead shot 153 sized and configured as discussed above maximizes vibration damping capacity at the lowest possible cost. The results of field tests conducted by applicant on actual road planing equipment and operation with several damping materials are shown in FIGS. 5 through 7. FIG. 5 shows the results of vibration tests conducted wherein solid lead ingots were used for ballast and for vibration damping. It is noted that primary vibrational peaks in all three spatial axes occur at approximately 1,000 Hz. or cycles per second.

The vibration is particularly severe in the vertical mode with secondary peaks occurring in the 6 Hz. to 15 Hz. range. Although the solid lead ingots have the highest possible density of approximately 0.411 pounds per cubic inch and hence provide adequate ballast for the sub-frame 3, because they are solid they are relatively poor dampers of vibration.

Additional tests were conducted with spherical shot, the results of which are shown in FIG. 6. As compared to the test results using ingots as shown in FIG. 5, the spherical shot greatly reduced vibration in all three spatial axes.

Finally, FIG. 7 shows the results of tests conducted using random-sized lead shot 153. The random-sized shot is particularly effective for reducing vibration in the vertical axis. In fact, in the vertical axis the random-sized shot 153 was approximately as effective as the spherical shot in absorbing vibration. Since vibration in the vertical axis is most detrimental to performance and blade life, the overall performance of the random-sized shot is considered to be nearly the equivalent of the spherical shot and hence, because the former is considerably less expensive, it is preferred for the vibration damper 151 of the present invention.

The ellipsoidal and spheroidal shot particles are particularly well adapted for vibrating with respect to each other because their rounded surfaces tend to allow a certain amount of movement and preclude clumping and bridging. In operation, the sub-frame 3 filled with the lead shot 153 becomes significantly warmer than a comparable sub-frame 3 provided with lead ingots, which indicates that the lead shot 153 functions as an effective transducer for converting vibrational energy from the engine 103 and the cutter head 117. Furthermore, the configuration of the sub-frame 3 is particularly designed for effective vibration transfer from the engine 103 and the cutter head 117 to the slightly constrained mass comprising the lead shot 153. Specifically, the engine mounts 61, 102 are placed on the engine section side tubes 66, 67 and the tool section front crosstube 75 respectively, all of which are filled with the lead shot 153. Vibration from the right angle drive transmission 124 is transmitted through the transmission support assembly 126 directly to the tool section side tubes 73, 74. Vibration from the cutter head 117 is transmitted through the cutter head mounting brackets 111 directly to the tool section side tubes 73, 74. Finally, the ballast compartments 91, 92 are located whereby much of the vibrational energy from both the engine 103 and the cutter head 117 will be transferred thereto.

As compared to the same planer 1 without damping, it has been determined that operating speeds of approximately 20% faster may be achieved by employing the lead shot 153 for vibration damping and balast than with solid lead ingots used for balast alone.

The random-sized shot 153 has a density of approximately 0.371 pounds per cubic inch, or approximately 90% of the density of solid lead whereby the void volume in the shot 153 equals approximately 10% of its total volume. The road planer 1 weighs approximately 38,000 to 40,000 pounds and a total weight of lead shot 153 of approximately 800 to 1,000 pounds is employed.

It is to be understood that while certain forms of the present invention have been illustrated and described herein, it is not to be limited to the specific forms or arrangement of parts described and shown.

What is claimed and desired to be secured by letters patent is as follows:

1. A vibration damper for a machine having a main frame, a prime mover and a driven device operably connected to said prime mover, which comprises:
    a sub-frame connected to said main frame and including a prime mover section having a first member with a void space therein and a driven device section having a second member with a void space therein;
    prime mover mounting means mounting means mounting said prime mover on said prime mover section of said sub-frame;
    driven device mounting means mounting said driven device on said driven device section of sub-frame;
    slightly constrained mass means located in said void spaces and comprising a plurality of particles adapted to vibrate with respect to each other and with respect to said frame members; and
    vibration transfer means adapted to transfer vibration from said prime mover and said driven device to said slightly constrained mass means in order to increase effectiveness of said driven device and to reduce wear of said driven device.

2. The vibration damper according to claim 1 wherein:
    said prime mover sub-frame section comprises a pair of side tubes each having a bore with said particles therein; and
    said driven device section including a pair of side tubes each having a bore with said particles therein.

3. The vibration damper according to claim 2, which includes:
    a crosstube interconnecting said prime mover section side tubes and said driven device section side tubes, said crosstube having a bore with said particles therein and extending transversely between said driven device section side tubes.

4. The vibration damper according to claim 2, which includes:
    a ballast compartment extending transversely between said driven device section side tubes;
    a lead ingot located in said ballast compartment, said lead ingot being smaller than said compartment whereby a ballast compartment space is formed between said lead ingot and said driven device sub-frame section; and
    said ballast compartment space being filled with said particles.

5. The vibration damper according to claim 4, wherein
    said ballast compartment comprises a front ballast compartment; and
    a back ballast compartment extending transversely between said driven device section side tubes, said back ballast compartment being substantially filled with said particles.

6. The vibration damper according to claim 2 wherein:
    said driven device mounting means comprises a pair of driven device mounting brackets each attached to and depending downwardly from a respective driven device side tube.

7. The vibration damper according to claim 2 wherein:
    said prime mover mounting means comprises a pair of engine mounts each attached to a respective prime mover section side tube.

8. The vibration damper according to claim 3 wherein:
    said prime mover mounting means includes a prime mover mount attached to said crosstube.

9. The vibration damper according to claim 2, which includes:
    a gear drive transmission interconnecting said prime mover and said driven device; and
    a pair of gear drive transmission support assemblies each attached to a respective driven device section side tube and said gear drive transmission.

10. In a pavement-working machine having a main frame with drive wheels mounting thereon, a cutter head and an engine operably connected to said drive wheels and said cutter head, the improvement of a vibration damper which comprises:
    a sub-frame disposed externally of said cutter head and including:
        an engine section having a front crosstube and a pair of engine section side tubes extending rearwardly from said front crosstube;
        a tool section including a transverse tool section front crosstube attached to said engine section side tubes, a pair of tool section side tubes extending rearwardly from said tool section front crosstube, a crossbar extending transversely across said tool section between said tool section side tubes in spaced relation rearwardly from said front crosstube, a rear ballast compartment panel extending transversely between said tool section side tubes in spaced relation behind said crossbar, upper and lower panels extending between said tool section side tubes and between said tool section crosstube, said crossbar and said rear ballast compartment panel;
        a pair of front engine mounts each attached to a respective engine section side tube and said engine;
        a pair of rear engine mounts each attached to said tool section front crosstube and said engine;
        a pair of cutter head mounting brackets each attached to and depending downwardly from a respective tool section side tube for mounting said cutter head;
        said engine section side tube, said tool section front and back crosstubes and said tool section side tubes being hollow and forming respective bores therein;
        a front ballast compartment between said tool section front crosstube, said crossbar and said upper and lower ballast compartment panels; and
        a rear ballast compartment between said crossbar, said rear ballast compartment panel and said upper and lower ballast compartment panels;
    each said bore being substantially filled with lead shot particles adapted to move with respect to each other in response to vibration of said sub-frame;
    an ingot located in said front ballast compartment, said ingot being smaller than said front ballast compartment whereby a front ballast space is formed between said ingot and said sub-frame, said front ballast compartment space being substantially filled with lead particles; and
    said rear ballast compartment being substantially filled with said lead shot particles in order to increase effectiveness of said cutter head and to reduce cuter head wear.

11. The vibration damper according to claim 10 wherein:
    said particles are random-sized and pass through a No. 7 mesh.

12. The vibration damper according to claim 10 wherein:
    said particles are random-sized and pass through a No. 17/18 mesh.

13. A method of damping vibration in a machine including a main frame and a sub-frame, a prime mover mounted of said sub-frame for driving a driven device supported on a shaft mounted on said sub-frame, wherein said method comprises the steps of:
    pivotally connecting said mainframe and said sub-frame;
    providing a slightly constrained mass within said sub-frame;
    transmitting vibrational energy from said prime mover and said driven device to said slightly constrained mass;
    converting said vibrational energy in said slightly constrained mass to thermal energy;
    transferring said thermal energy from said slightly constrained mass to said frame; and
    dissipating said thermal energy from said frame, thereby increasing effectiveness of the driven device.

14. The method according to claim 13, which includes the additional step of urging said driven device downwardly with the weight of said slightly constrained mass.

15. A vibration damping assembly for a machine, comprising:
    frame means having a void spaced formed therein;
    vibration means mounted on said frame means, said vibration means comprising a combustion engine for driving a tool; and
    a slightly constrained mass provided in said void space and comprising a plurality of particles adapted to move with respect to each other and with respect to said frame means, said mass comprising a lead ingot and lead shot particles having rounded configurations.

16. The vibration damping assembly of claim 15 wherein said vibration means further comprises said tool and wherein said tool is mounted on said frame means.

17. The vibration damping assembly of claim 15 wherein said frame means comprises a pair of side tubes each having a respective bore filled with said particles.

18. A vibration damper for a machine having a main frame, a prime mover and a drive device operably connected to said prime mover, which comprises:
- a sub-frame pivotally connected to said main frame and having a structural member with a void space therein;
- prime mover mounting means mounting said prime mover on said sub-frame;
- driven device mounting means mounting said driven device on said sub-frame;
- slightly constrained mass means located in said void space and comprising a plurality of particles adapted to vibrate with respect to each other and with respect to said frame member; and
- vibration transfer means adapted to transfer vibration from said prime mover and said driven device to said slightly constrained mass in order to increase effectiveness of said driven device and to reduce wear of said driven device.

19. A vibration damper for a road planar having a main frame, a prime mover and a driven device operably connected to said prime mover, which comprises:
- a sub-frame connected to said main frame externally of said driven device and having a structural member with a void space therein;
- prime mover mounting means mounting said prime mover on said sub-frame;
- driven device mounting means mounting said driven device on said sub-frame;
- slightly constrained mass means located in said void space and comprising a plurality of particles adapted to vibrate with respect to each other and with respect to said frame member;
- vibration transfer means adapted to transfer vibration from said prime mover and said driven device to said slightly constrained mass in order to increase effectiveness of said driven device and to reduce wear of said driven device.

20. The vibration damper according to claim 19 wherein:
said driven device comprises a rotary cutter head rotating about a rotational axis extending transversely with respect to said sub-frame.

* * * * *